United States Patent [19]

Torke

[11] 4,023,652
[45] May 17, 1977

[54] BUMPER ARRANGEMENT FOR VEHICLES WITH AT LEAST ONE DEFORMATION TUBE

[75] Inventor: Gernot Torke, Neu-Ulm, Germany

[73] Assignee: Volkswagenwerk Aktiengesellschaft, Wolfsburg, Germany

[22] Filed: May 28, 1975

[21] Appl. No.: 581,675

[30] Foreign Application Priority Data

June 4, 1974 Germany .......................... 2426938

[52] U.S. Cl. ................................. 188/1 C; 293/70; 293/DIG. 3
[51] Int. Cl.² ........................................ F16F 9/30
[58] Field of Search ....... 293/70, 1, 85, 86, DIG. 3; 188/1 C; 213/1 A; 267/152, 153; 74/492

[56] References Cited

UNITED STATES PATENTS

| | | | |
|---|---|---|---|
| 2,870,871 | 1/1959 | Stevinson | 293/DIG. 3 |
| 3,307,868 | 3/1967 | Blank | 188/1 C X |
| 3,315,951 | 4/1967 | Boschi et al. | 267/153 |
| 3,835,725 | 9/1974 | Furusho et al. | 74/492 |

Primary Examiner—Robert B. Reeves
Assistant Examiner—John P. Shannon
Attorney, Agent, or Firm—Brumbaugh, Graves, Donohue & Raymond

[57] ABSTRACT

A bumper arrangement for a vehicle is comprised of a deformable tube located between two flat plane plates. One end of the tube is flaired in order to create a flange region. During an impact the tube deforms, starting at the flanged end of the tube, into a series of corrugations having a toroidal shape.

1 Claim, 3 Drawing Figures

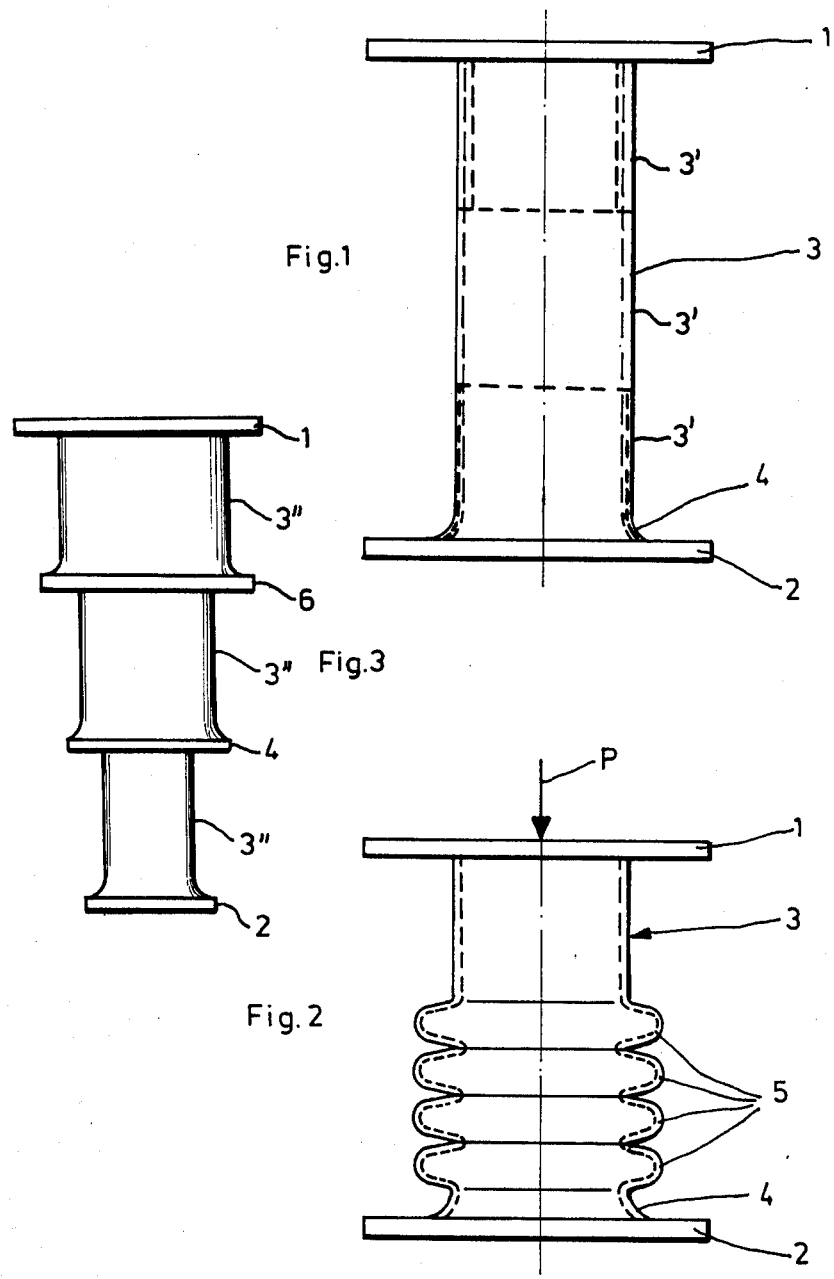

BUMPER ARRANGEMENT FOR VEHICLES WITH AT LEAST ONE DEFORMATION TUBE

BACKGROUND OF THE INVENTION

This invention is related to a bumper arrangement and, more particularly, to a bumper arrangement having at least one deformation tube with one flanged end.

In some bumper arrangements for automobiles there are deformation tubes located between a bumper bar extending transverse to the longitudinal axis of the vehicle and the vehicle chassis. These tubes have a smooth initial shape and are flanged on one end. During a collision the tubes, in concert with elements that act on their ends, deform and dissipate compressive forces in the axial direction of the tube.

An arrangement of this type is disclosed in German Pat. No. 1,152,558, 63c, 70. In that patent the flanged end of the tube as well as the other end are clamped in elements having different diameters so that in the event of a shock, e.g., a collision involving the vehicle, a progressive overturning or turning inside out of the tube occurs, i.e., the tube flairs out and folds back on itself. The increase in the diameter of the tube connected with the overturning of the tube results in the energy dissipation desired.

In a similar arrangement in accordance with German Pat. No. 1,267,114, 63c, 70, the element adjacent to the flanged end forms a curved ring-shaped bearing surface for the flanged end. Here again, a progressive overturning of the tube with a simultaneous enlargement of its diameter is achieved.

SUMMARY OF THE INVENTION

It is the purpose of the present invention to create a deformable tube for a bumper arrangement that ensures an especially high degree of deformation and, hence, an especially good energy dissipation. This purpose is attained by having the element that acts on the flanged end of the tube designed as a flat plane seat that extends over at least the cross section of the flange.

In accordance with German Pat. No. 1,152,558, the flanged end is framed, and in accordance with German Pat. No. 1,267,114, the flanged end is supported on a ring-shaped seat that appears curved in cross section. However, in the present invention there is provided a flat seat for the flanged tube end, which must extend over the complete cross-sectional zone of the flange. Consequently, it extends over the cross sectional zone which starts with the inner surface of the tube and ends with the outer edge of the flanged tube end. Surprisingly, it has been found that with such an arrangement, there is no turning back or turning inside out of the flanged tube end and no tearing or breaking of the tube material. Rather, an accordion-like deformation of the tube occurs, starting at the flanged tube end, i.e. successive corrugations or toruses are formed. With a modification of the diameter, thickness and/or strength of the tube material, e.g., by a combination of several tubes succeeding each other in the axial direction, it is possible to achieve a controlled energy dissipation. However, flat plane seats must be provided for any tube that has a flanged end.

BRIEF DESCRIPTION OF THE DRAWINGS

The foregoing and other features of the present invention will be more readily apparent from the following detailed description and drawings in which:

FIG. 1 is an illustrative embodiment of the tube of the present invention in its initial state;

FIG. 2 shows the tube of FIG. 1 after it is stressed by a force P, that must be dissipated; and FIG. 3 shows a series of tubes of different diameters.

DESCRIPTION OF A PREFERRED EMBODIMENT

FIG. 1 shows two flat plane plates 1 and 2 between which is placed a deformation tube 3 with a flanged end region 4. As is shown in FIG. 2, the application of a force P causes the formation in the tube of corrugations of tori 5, starting at the end zone 4. The outer peak zones of the tori 5 have a considerably larger diameter than the tube 3 in its initial state. However, between successive tori, there are zones whose diameter corresponds at least approximately to the original diameter of the tube 3.

This result, which is achieved by using a flat plane seat 2 for the flanged tube end 4, is astonishing in that it is known that the deformation of a tube in the axial direction is very difficult. As a rule, the tube will buckle or react to the axial force applied by rupture of the material. However, due to the simple arrangement in accordance with the invention, namely, the flanging of at least one tube end and the providing of a flat plane seat for it, these undesirable reactions of the tube to high axial forces are avoided and are replaced by an intended, large energy-dissipating deformation of the tube.

It is of special significance that even with a relatively thick-walled tube (e.g., a tube with a wall thickness of 2 mm, a diameter of 110 mm and a length of 450 mm) there is no initial peak force of a magnitude sufficient to damage the other parts of the vehicle. Instead of transmitting this force to the plate 2, the tube will begin to deform. However, it is precisely a thick-walled tube that is most favorable with respect to high energy dissipation.

In one application these deformable tubes can be used to mount a bumper onto a vehicle. In fact the plate 1 can be a surface on the bumper and plate 2 can be a surface on the vehicle. In such a case the tube portion 3 would be attached to the surfaces by suitable means, e.g., welding.

The tube shown in FIG. 1 can be made with increased wall thickness near the plate 1, thus causing an increase in the resistance to the collision forces as the vehicle body is neared by a colliding body. Alternatively, the tube could be made out of a different strength material in this region to accomplish the same result. To bring about this change in tube strength, the tube 3 can be made from a series of different tubes 3' (shown dotted in FIG. 1) welded together. The only requirement is that the flanged end be in contact with a flat plane surface.

Another method of achieving controlled deformation is illustrated in FIG. 3. FIG. 3 shows a series connection of tubes 3" having different diameters and being separated by flat plates 6. These tubes can be designed to form their corrugations in succession with increasing resistance to the impact.

While the invention has been particularly shown and described with reference to a preferred embodiment thereof, it will be understood by those skilled in the art that various changes in form and details may be made therein without departing from the spirit and scope of the invention.

I claim:

1. A shock absorbing device comprising:
several deformable cylindrical tubes, each tube being made of a material with a strength different than the others, said tubes being connected axially in series with one another, said tubes being smooth in their initial state and at least one of said several tubes having outwardly flaired annular flanged end; and
elements acting on the ends of said series of tubes for introducing approximately axial compressive forces to the tubes, at least one of said elements acting on the flanged end of the tube and being a flat plane plate extending at least over the cross section of the flange.

* * * * *